C. LE G. FORTESCUE.
IONIZING ELECTRODE FOR PRECIPITATING APPARATUS.
APPLICATION FILED FEB. 25, 1919.
1,428,839.
Patented Sept. 12, 1922.
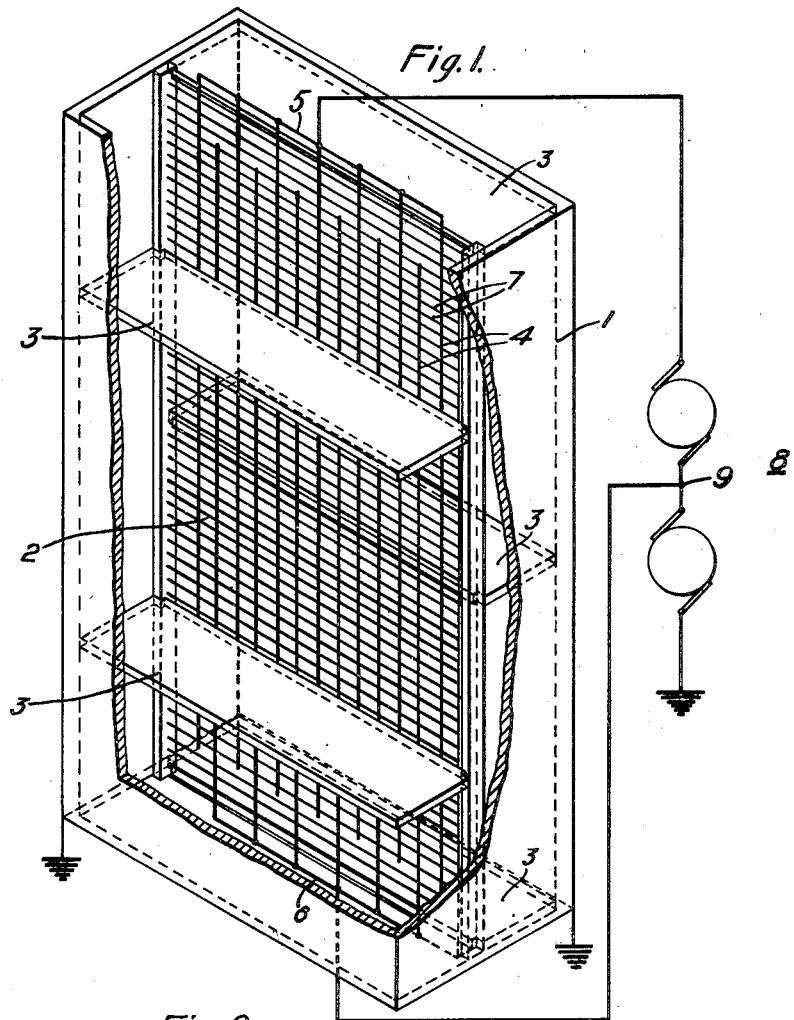
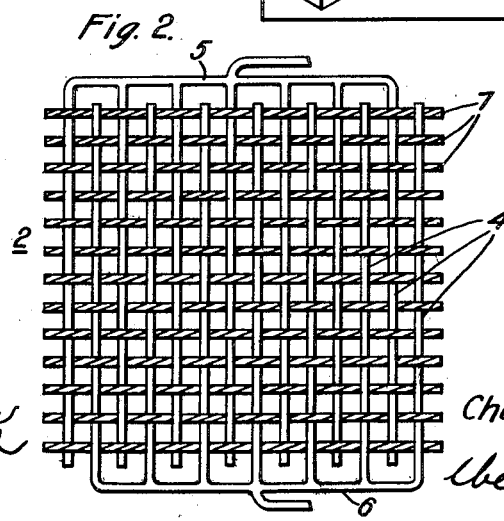
WITNESSES:
H.J. Shelhamer
a.a. Brand
INVENTOR
Charles Le G. Fortescue
BY
Wesley J. Carr
ATTORNEY Patented Sept. 12, 1922.

1,428,839

UNITED STATES PATENT OFFICE.

CHARLES LE G. FORTESCUE, OF PITTSBURGH, PENNSYLVANIA, ASSIGNOR TO WESTINGHOUSE ELECTRIC & MANUFACTURING COMPANY, A CORPORATION OF PENNSYLVANIA.

IONIZING ELECTRODE FOR PRECIPITATING APPARATUS.

Application filed February 25, 1919. Serial No. 279,205.

*To all whom it may concern:*

Be it known that I, CHARLES LE G. FORTESCUE, a subject of the King of Great Britain, and a resident of Pittsburgh, in the county of Allegheny and State of Pennsylvania, have invented a new and useful Improvement in Ionizing Electrodes for Precipitating Apparatus, of which the following is a specification.

My invention relates to apparatus for electrically precipitating suspended particles from flowing-fluid streams and has especial relation to the provision of a discharge electrode for systems of the character designated which shall be conducive to intense pre-ionization of the fluid to be treated.

In the accompanying drawing, Fig. 1 is a perspective view of one form of apparatus in which a discharge electrode constructed in accordance with my invention, is employed; and Fig. 2 is a fragmentary elevational view, on a greatly enlarged scale, of a discharge electrode.

In my copending application, Serial No. 277,349, filed February 15, 1919, is described a precipitating system in which the discharge electrode and the collecting electrode, the latter being formed as a treating chamber, are so disposed and associated with baffle members that the fluid to be treated is compelled to pass several times through the discharge electrode during its movement through the treating chamber. This method of precipitation insures a maximum ionization and charging of the suspended particles of the fluid and is instrumental in obtaining a high rate of precipitation.

I find that a foraminous or reticulated electrode, which may be employed with advantage in precipitating systems, as described in the aforementioned copending application, may be formed as a woven member, the warp portions thereof being of conducting material and the woof threads being of insulating material. If alternate conducting warp threads are connected to form two sets which are inter-leaved, one set being connected to a point of one potential and the other set being connected to a point of a different potential, it is apparent that an electrostatic field will be set up between the adjacent warp threads, while any danger of short-circuit is obviated by the insulating woof members. Such an electrostatic field will, therefore, provide an intense ionizing medium through which the fluid to be treated may be passed by impelling it to move through the foraminous structure.

In Fig. 1, a collecting electrode, formed as a treating chamber, is shown at 1. A foraminous reticulated discharge electrode 2 is disposed within the treating chamber 1 and is so associated with baffle members 3—3 that any fluid passing through the treating chamber is impelled to pass through the reticulated structure 2 several times during its movement within the treating chamber.

Referring now to Fig. 2, the detailed structure of a reticulated electrode, constructed in accordance with my invention, is shown. The warp is composed of a plurality of conducting threads or wires 4 which are divided into two sets 5 and 6, the threads of each set being so connected together that they are adapted to be charged from any suitable source of potential difference. The oppositely charged inter-leaved and alternating warp wires are insulated from one another by woof threads 7—7. I find that, for purposes of convenience, it is frequently desirable to make alternating set of warp threads of metals which are different in color, thereby making it easy to distinguish readily between oppositely charged wires of the woven electrode member.

It is apparent that the existence of opposite charges upon the alternate warp wires is conducive to the establishment of an intense ionizing field therebetween, and, since this field is established in its most intense and optimum form for ionizing purposes in the plane of the electrode itself, any fluid which is passed through the reticulated electrode will be advantageously ionized.

Referring again to Fig. 1, the method of energizing the discharge electrode, as well as the system as a whole, is shown. One system which I regard as simple in character and as indicative of the character of the desirable connections contemplates the use of a three-wire direct-current apparatus 8 to furnish operating energy. One side of the apparatus is grounded, as is also the collecting electrode or treating chamber of the precipitating apparatus, while the other point of extreme potential is connected to one set of the warp threads. It is obvious, of course, that it is not desirable to impress upon the adjacent wires a potential which at all approaches the potential impressed across the electrodes, as a whole. The other set of warp wires is, therefore, attached to a point 9 intermediate the two extreme voltages of the apparatus 8 or, in other words, a potential difference substantially less than that existing across the electrodes themselves, is impressed between the two sets of warp wires.

Since I believe I am the first to disclose a method of electrical precipitation, in which an intense ionizing field is positively established in the plane of the discharge electrode and the fluid to be treated is passed therethrough prior to its coming under the influence of the electrostatic field existing between the electrodes, as a whole, I desire that the broadest possible construction be placed upon the appended claims and that their scope be limited only by the prior art or by restrictions specifically set forth therein.

I claim as my invention:

1. In a system of precipitation, a source of energy therefor, a collecting electrode formed as a treating chamber, a reticulated discharge electrode, and means whereby said discharge electrode may be charged with potentials of different values substantially simultaneously.

2. In a system of precipitation, a source of energy therefor, a collecting electrode formed as a treating chamber, a reticulated discharge electrode, and connecting means for charging one portion of the discharge electrode at one potential, the collecting electrode at another potential and another portion of the discharge electrode at a potential intermediate said first-named potentials.

3. In a system of precipitation, a source of energy therefor, a collecting electrode formed as a treating chamber, a reticulated discharge electrode formed as a woven member the warp of which is of conducting material and the woof of which is of insulating material, and connecting means for charging one portion of the conducting warp of the discharge electrode at one potential, the collecting electrode at another potential and another conducting warp portion of the discharge electrode at a potential intermediate said first-named potentials.

4. In a system of precipitation, a source of energy therefor, a collecting electrode formed as a treating chamber, a reticulated discharge electrode formed as a woven member, the warp thereof comprising conducting threads and the woof comprising insulating threads, alternate warp threads being adapted for charging at one potential and the warp threads intermediate said alternate threads adapted for charging at another potential.

5. In a system of precipitation, a source of energy therefor, a collecting electrode formed as a treating chamber, a reticulated discharge electrode formed as a woven member, the warp thereof comprising two sets of parallel-connected conducting threads, the threads of each set alternating with the threads of the other set, whereby, when said sets are charged with potentials of different values, an intense ionizing field is established between the pairs of warp threads.

6. In combination with a system of precipitation, and a source of energy therefor, a discharge electrode formed as a woven member having a conducting warp and an insulating woof, and means for establishing an intense ionizing field adjacent to said discharge electrode.

7. In combination with a system of precipitation, and a source of energy therefor, a discharge electrode formed as a woven member having a conducting warp and an insulating woof, and means for establishing an intense ionizing field between the warp threads.

8. In combination with a system of precipitation, and a source of energy therefor, a discharge electrode formed as a woven member having a conducting warp and an insulating woof, and means for charging alternate adjacent warp threads with potentials of different values, whereby an intense ionizing field is established therebetween.

9. In a system of precipitation, comprising a collecting electrode, a foraminous two-part discharge or ionizing electrode co-acting therewith, and a source of energy supply therefor, the method of electrically precipitating suspended particles from fluid streams which consists in charging the collecting and the discharge electrodes with the full potential difference of said energy source, thereby establishing an electrical field therebetween, charging the two portions of the discharge electrode at a potential difference less than the full potential difference of the energy source, whereby an intense ionizing field is established in the plane of the discharge electrode, and then passing the fluid to be treated through the foraminous discharge electrode and into the electrical field between the electrodes.

10. In a system of precipitation, a source of energy therefor, a collecting electrode formed as a treating chamber, a reticulated discharge electrode comprising mutually insulated portions, and means whereby the portions of said discharge electrode may be charged with potentials of different values substantially simultaneously.

11. In a system of precipitation, a source of energy therefor, a collecting electrode formed as a treating chamber, a reticulated discharge electrode comprising mutually insulated portions, and connecting means for charging one portion of the discharge electrode at one potential, the collecting electrode at another potential and another portion of the discharge electrode at a potential intermediate said first-named potentials.

In testimony whereof, I have hereunto subscribed my name this 19th day of Feb., 1919.

CHARLES LE G. FORTESCUE.